May 13, 1952    G. L. HAMMON    2,596,681
VALVE PACKING ASSEMBLY
Filed Jan. 24, 1948
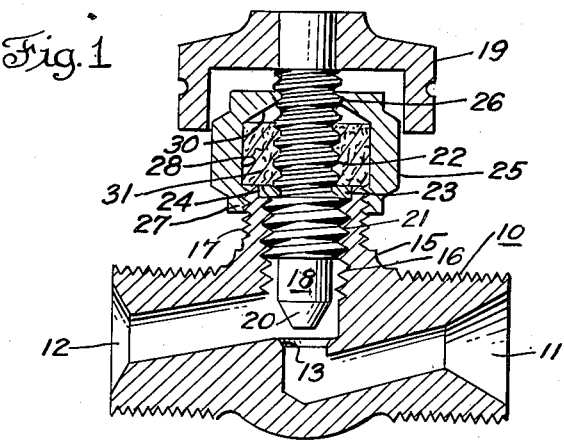
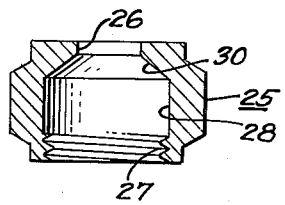
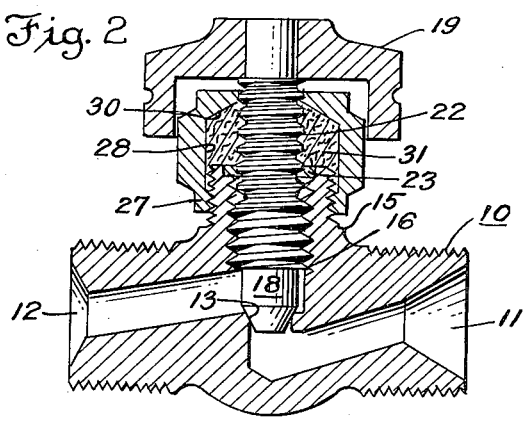
INVENTOR.
GEORGE L. HAMMON
ATTORNEY Patented May 13, 1952

2,596,681

UNITED STATES PATENT OFFICE 2,596,681

VALVE PACKING ASSEMBLY

George Leonard Hammon, Berkeley, Calif., assignor to National Welding Equipment Co., San Francisco, Calif., a corporation of California Application January 24, 1948, Serial No. 4,101

1 Claim. (Cl. 251—50)

This invention relates to an improved valve with particular reference to an improved valve packing assembly. Even more particularly it relates to a valve packing nut which locks the packing material against accidental displacement of the nut and conforms the packing material to a shape in which it effectually prevents leakage.

Valve packing nuts are used to hold packing material around the movable threaded valve stem of a valve. Heretofore leakage has occurred around the packing, sometimes due to accidental displacement of the nut and sometimes due to leakage between the packing and the nut or between the packing and the neck around which the packing nut is threaded. This leakage has been a serious matter in valves using oxygen, hydrogen, and acetylene under high-pressure, because such leakages are not only wasteful but may also be dangerous fire hazards. Attempts have been made to prevent leakage by such methods as providing the packing nuts with interior threads, but these attempts have been unsuccessful.

One object of this invention is to solve the above-mentioned problems.

Another object of the invention is to provide an improved valve in which leakage around the packing is effectually eliminated.

Another object of the invention is to provide an improved valve packing nut which holds the packing more tightly against the edges where leaks have heretofore occurred.

Another object of the invention is to provide a valve packing nut which has a counterbored chamber by which a new mode of operation is achieved, namely, a cooperative locking of the packing and the nut in a tight sealing position.

Another object of this invention is to provide a valve packing nut which when installed becomes pressure-locked by the packing, so that it cannot work loose by itself but must be forcibly screwed off.

Another object of the invention is to provide an improved counterbored packing cap or nut which, when threaded on the neck of the valve housing, will cause the packing material to be locked in a spring-like manner around the valve stem and against the neck of the valve housing and the nut.

Other objects and advantages of the invention will appear from the following detailed description of an embodiment thereof, in accordance with U. S. Revised Statutes, Section 4888. It is not intended, however, to limit the scope of the claim to this particular embodiment.

Fig. 1 is a view in elevation and in section of a valve in which a packing nut embodying the principles of this invention is shown in its upper position before it is threaded down around the neck of the valve body;

Fig. 2 is a view similar to Fig. 1, in which the packing nut has been threaded down around the neck into its final packing-locking position; and Fig. 3 is a view in section of the packing nut.

This invention is illustrated as it is used with a valve, having a body member 10, a passage 11, 12 therethrough, a valve seat 13 in the passage, an interiorly and exteriorly-threaded neck 15 on the body member 10 adjacent the valve seat 13, and a valve stem 18 threaded into the interior threads 16 of the neck and against the seat 13. The invention combines with the above elements a hollow packing nut 25 having an interiorly threaded rim 27 adjacent one end thereof, the threads of rim 27 matching the exterior threads of the neck 15 and said packing nut 25 having above the threaded rim 27 a counterbored chamber 28 of wider bore than the threaded portion. Above the counterbored chamber 28, a shoulder 30 tapers away from the chamber 28 and in toward an opening 26 in the upper end of the nut which is large enough to fit around the valve stem 18 with a narrow clearance. Packing material 31 is held inside the nut 25, and when the nut is threaded into its final position shown in Fig. 2, the packing is thereby conformed under pressure, to the shape of the nut interior. The packing material 31 is forced around the top of the neck 15 and into its exterior threads 17, and also bears against the shoulder 30 above the chamber 28.

A more detailed description will now be given. The housing or body member 10 is pierced by an inlet passage 11 and an outlet passage 12, which join at a valve seat 13. Adjacent the seat 12 and surrounding it, is a housing neck 15, the inside of which is threaded at 16 and the outside of which is threaded at 17.

The valve is closed by a needle-valve stem 18 which is moved in until its head 20 abuts against the seat 13. The stem 18 bears a V-shaped thread 21, which is screwed in and out of the interior threads 16 of the neck 15 by a stem handle 19. Preferably the stem 18 also has flat threads 22 above the V-shaped thread 21, which engage the packing and act as a frictional brake and as a longitudinal cushion or resistance to take up the usual lost motion in the valve, in the manner described in my earlier invention, Patent No. 1,944,428. Around the stem 18 above the V-thread 21 is a washer 23 which rests in a recess 24 at the upper end of the neck 15.

A hollow valve-packing nut 25 fits around the stem 18 and holds the packing. At the top of the nut 25, is a narrow opening 26, wide enough to slip over the top of the valve stem 18 with a narrow clearance, before the handle 19 is put on. At the bottom of the nut 25 is an interiorly-threaded rim 27, which is threaded down around the threads 17 of the neck 15. The rim 27 is considerably shorter than the exterior portion of neck 15 so that, when the nut is in place, the top of the neck projects beyond the end of the rim 27 (see Fig. 2) into a counterbored chamber 28. This chamber 28 is of wider bore than the rim 27, and its top wall or shoulder 30 is tapered upward toward the upper opening 26.

The counterbored chamber 28 holds the packing, the preferred type of which is a ring 31 made of asbestos, lead wire, copper wire, and vegetable oil.

When the packing nut 25 is placed in the position shown in Fig. 1, the ring 31 rests inside the chamber 28, on the washer 23 and the rim of the neck 15. When the nut 25 is threaded down into the position shown in Fig. 2, the ring 31 is compressed until it fills all the interior space of the nut 25 around the stem 18. It is forced up to conform against the shoulder 30 and also is forced down against the top of the washer 23 and down around the top and outside of the neck 15.

The smooth counterbore 28 permits the packing 31 to compress vertically against the lip of the valve body 15, the point where leaks generally occur first in packing nuts now in use. By this compression the area of packing contact on the neck 15 is increased, and the packing 31 extends over the top and down around the outside of the neck 15 into those threads 17 which project into the chamber 28. As a result, the unit is locked in two ways. First, the packing compressed into the threads 17 holds the nut down, since before the nut 25 can back off, it must first force away the packing from the threads 17. Second, the packing 31 takes on the definite shape, shown in Fig. 2, against the counterbore wall and the shoulder 30, and this shape must be upset vertically before the nut 25 can be backed off the neck 15.

I claim:

In a closure valve combination for gases, having a body member, a passage therethrough, a valve seat in said passage, an interiorly- and exteriorly-threaded neck on said body member adjacent said seat, and a valve stem threaded into said neck so that it can close against and be moved away from said seat, the additional elements of a hollow packing nut, having adjacent one end an interiorly threaded rim substantially shorter than the height of said neck above said body member, the threads matching the exterior threads of said neck, a counterbored chamber adjacent to and of wider bore than said threaded rim, a shoulder portion adjacent the opposite end of said chamber and tapered away therefrom toward an opening wide enough to give said valve stem a narrow clearance within it, and a yieldable packing material filling the interior of said nut around said valve stem.

GEORGE LEONARD HAMMON.

REFERENCES CITED

The following references are of record in the file of this patent:

UNITED STATES PATENTS

| Number | Name | Date |
|---|---|---|
| 350,116 | Chapman | Oct. 5, 1886 |
| 1,738,437 | Langdon | Dec. 3, 1929 |
| 1,825,807 | Martin | Oct. 6, 1931 |
| 1,944,428 | Hammon | Jan. 23, 1934 |

FOREIGN PATENTS

| Number | Country | Date |
|---|---|---|
| 125,990 | Great Britain | of 1920 |
| 156,883 | Switzerland | of 1932 |
| 263,398 | Germany | of 1913 |
| 422,813 | France | of 1911 |